United States Patent
Hill

(10) Patent No.: US 11,203,120 B1
(45) Date of Patent: Dec. 21, 2021

(54) MOBILE ROBOTICS FRAME SYSTEM

(71) Applicant: Intrinsic Innovation LLC, Mountain View, CA (US)

(72) Inventor: Michael Barrett Hill, San Jose, CA (US)

(73) Assignee: Intrinsic Innovation LLC, Mountain View, CA (US)

( * ) Notice: Subject to any disclaimer, the term of this patent is extended or adjusted under 35 U.S.C. 154(b) by 273 days.

(21) Appl. No.: 16/269,155

(22) Filed: Feb. 6, 2019

(51) Int. Cl.
| | |
|---|---|
| B25J 9/16 | (2006.01) |
| B25J 18/06 | (2006.01) |
| B25J 9/00 | (2006.01) |
| B25J 5/00 | (2006.01) |

(52) U.S. Cl.
CPC ........... B25J 9/1694 (2013.01); B25J 5/007 (2013.01); B25J 9/0087 (2013.01); B25J 18/06 (2013.01)

(58) Field of Classification Search
USPC ............................... 700/245–264
See application file for complete search history.

(56) References Cited

U.S. PATENT DOCUMENTS

| | | | | |
|---|---|---|---|---|
| 6,037,733 A * | 3/2000 | Genov | ............. | B25J 9/1615 318/568.11 |
| 7,039,499 B1 * | 5/2006 | Nasr | ............. | B25J 9/046 206/710 |
| 7,641,461 B2 | 1/2010 | Khoshnevis | ............. | B29C 64/106 425/60 |
| 9,020,636 B2 * | 4/2015 | Tadayon | ............. | B25J 5/005 700/247 |
| 9,026,250 B2 * | 5/2015 | Summer | ............. | A61G 5/1094 700/257 |

(Continued)

FOREIGN PATENT DOCUMENTS

| | | | |
|---|---|---|---|
| CN | 105666478 A | * | 6/2016 |
| CN | 207643124 U | * | 7/2018 |
| WO | WO 2016/009423 | | 1/2016 |

OTHER PUBLICATIONS

'campaign.konecranes.com [online] "Konecranes: Industrial Cranes, Experience Where you Need it" Copyright 2018 Konecranes, Available on or before Nov. 2018, [retrieved on Feb. 5, 2019] Retrieved from Internet: URL<http://campaign.konecranes.com/industrial-equipment/?_ga=2.55047659.1132455706.1549380816-131711542.1549380816#/article/9/page/1> 25 pages.

Primary Examiner — Jonathan L Sample
(74) Attorney, Agent, or Firm — Fish & Richardson P.C.

(57) ABSTRACT

Methods, systems, and apparatus, including computer programs encoded on computer storage media, for a mobile robotic frame system. In some implementations, a mobile robot includes a motorized frame that is configured to travel to a location. The mobile robot includes a positioning assembly coupled to the motorized frame, a robotic arm having a manipulator, and sensors coupled to the motorized frame. A control system is configured to process data from the sensors and, based on the data from the sensors, provide control data to (i) move the motorized frame, (ii) adjust one or more movable components of the positioning assembly, and (ii) move the robotic arm relative to the motorized frame. The one or more movable components and the robotic arm are operable to position the manipulator at any position in a three-dimensional work volume with 6 degrees of freedom while the motorized frame remains at the location.

20 Claims, 6 Drawing Sheets

(56) References Cited

U.S. PATENT DOCUMENTS

| | | | |
|---|---|---|---|
| 9,393,686 B1* | 7/2016 | Bradski | G06T 7/60 |
| 9,708,079 B2* | 7/2017 | DesJardien | B25J 9/0018 |
| 2003/0040841 A1* | 2/2003 | Nasr | H01L 21/67769 |
| | | | 700/245 |
| 2004/0101393 A1* | 5/2004 | Lopez Alba | B66C 13/06 |
| | | | 414/680 |
| 2005/0034809 A1* | 2/2005 | Woodruff | H01L 21/6719 |
| | | | 156/345.1 |
| 2006/0259195 A1* | 11/2006 | Eliuk | G07F 11/70 |
| | | | 700/245 |
| 2009/0074151 A1* | 3/2009 | Henderson | A61B 6/4458 |
| | | | 378/198 |
| 2012/0053726 A1* | 3/2012 | Peters | B25J 15/0019 |
| | | | 700/252 |
| 2012/0061155 A1* | 3/2012 | Berger | B25J 5/007 |
| | | | 180/21 |
| 2013/0226340 A1* | 8/2013 | Buchstab | B25J 5/02 |
| | | | 700/245 |
| 2014/0205403 A1* | 7/2014 | Criswell | B65G 67/24 |
| | | | 414/395 |
| 2015/0032387 A1* | 1/2015 | Froom | G01N 29/225 |
| | | | 702/33 |
| 2015/0314890 A1* | 11/2015 | DesJardien | B25J 5/007 |
| | | | 212/324 |
| 2015/0332213 A1* | 11/2015 | Galluzzo | G06Q 10/087 |
| | | | 700/216 |
| 2015/0352721 A1* | 12/2015 | Wicks | B25J 9/1664 |
| | | | 700/228 |
| 2016/0009416 A1* | 1/2016 | Oberoi | B29C 39/123 |
| | | | 29/897.2 |
| 2016/0016315 A1* | 1/2016 | Kuffner, Jr. | B25J 9/1676 |
| | | | 700/255 |
| 2016/0039093 A1* | 2/2016 | Abdallah | B25J 5/04 |
| | | | 700/257 |
| 2016/0107312 A1* | 4/2016 | Morrill | G11B 15/68 |
| | | | 29/402.08 |
| 2016/0184032 A1* | 6/2016 | Romo | A61B 10/04 |
| | | | 606/130 |
| 2016/0288280 A1* | 10/2016 | Lin | B25J 9/0093 |
| 2017/0008094 A1* | 1/2017 | Nguyen | B23B 39/14 |
| 2017/0011580 A1* | 1/2017 | Huang | G06Q 30/0601 |
| 2017/0095382 A1* | 4/2017 | Wen | B25J 11/008 |
| 2017/0174431 A1* | 6/2017 | Borders | B65G 1/0421 |
| 2017/0282634 A1* | 10/2017 | Jones | B43M 3/02 |
| 2017/0312047 A1* | 11/2017 | Swarup | B25J 9/1641 |
| 2018/0009000 A1* | 1/2018 | Shang | H04N 13/204 |
| 2018/0104829 A1* | 4/2018 | Altman | B25J 9/162 |
| 2019/0009414 A1* | 1/2019 | Pay | B25J 13/02 |
| 2019/0142533 A1* | 5/2019 | Itkowitz | A61G 13/02 |
| | | | 700/254 |
| 2019/0246858 A1* | 8/2019 | Karasikov | B25J 5/007 |
| 2019/0255551 A1* | 8/2019 | Hargadon | B05B 13/0431 |
| 2019/0366556 A1* | 12/2019 | Wang | B22D 37/00 |
| 2019/0369641 A1* | 12/2019 | Gillett | A63F 9/24 |
| 2020/0256051 A1* | 8/2020 | Hernandez | B25J 9/0096 |
| 2021/0032031 A1* | 2/2021 | Kalouche | B65G 1/065 |

\* cited by examiner

MOBILE ROBOTICS FRAME SYSTEM

BACKGROUND

This specification relates generally to a mobile frame performing automated manufacturing tasks.

Some robotic and automation systems are limited to fixed locations for large industrial settings. Others operate on a small scale, for example, to perform specific tasks like material handling. These systems have limitations that may make conventional robots impractical in many manufacturing industries where areas of large products cannot be reached by static robots, or when mobile robots have limited payload capacity and reach.

SUMMARY

In some implementations, a mobile robotics frame system can be configured to autonomously perform tasks, such as constructing or repairing a workpiece. The mobile robotics frame system can include a large mobile autonomous frame that has the ability to span across large objects of workpieces, for example, in building construction, airplane manufacturing, and other fields in which manufacturing tasks currently cannot be reached by fixed automation systems. The mobile robotic frame can use sensor data to position itself with respect to a workpiece, for example, by moving the frame over the workpiece so a particular portion or component of the workpiece is in a working volume or "envelope" located within the frame.

In some implementations, the mobile robotic frame includes a positioning assembly that allows movement in multiple directions. For example, the actuating components may allow robotic arms or other manipulation elements to travel along multiple rails or tracks, so that a base or connection point for the manipulation elements can move laterally and vertically. A robotic arm may be capable of moving in 6 degrees of freedom (DOF) through its own actuatable joints, but the overall reach of the arm may be limited (e.g., by the length of the arm segments and the range of motion of the joints. The positioning assembly may allow the entire robotic arm to be moved, e.g., translated or shifted, so that the effective range of the arm can be moved to different positions within the working volume, to reach the workpiece in various positions. In some implementations, this combination of (i) a positioning assembly to move the arms to desired locations, and (ii) the positioning ability of the arms themselves (e.g., 5 DOF or 6 DOF positioning) can allow the arms in the mobile robotic frame system to access any position within the working volume. Depending on the implementation, the frame and arms may be able to not only reach any position in the working volume, but to access it from any direction or orientation (e.g., from above, from beneath, from left or right, or from any angle).

The mobile robotic frame can include a main frame, e.g., a structural frame or outer frame, includes a number of generally vertical legs or posts on motorized elements (e.g., wheels, treads, etc.). The outer frame is also referred to below as a motorized frame, as the motorized elements enable the frame system to travel from one location to another. The working volume is typically a volume located within the outer frame, e.g., a continuous, uninterrupted three-dimensional volume. This size and location of the working volume can be a fixed region within the outer frame, often the majority of or nearly all of (e.g., 80%, 90%, or more) of the area within the outer frame. The mobile robotic frame can move under its own power, with human-directed control, semi-autonomous control, or fully autonomous control. This allows the system to move to location where the working volume coincides with a region of a workpiece to be operated on. When working with large work pieces, e.g., constructing an airplane or a building, the system can move itself at different times as needed to position the working volume of the system around different parts of the workpiece.

The outer frame of the robot can include substantially vertical legs or posts that leave open areas between them. This allows the system to slide over stationary workpieces without interference. Various movable components of the positioning assembly can move within the interior of the outer frame, e.g., between the legs, to move robotic arms or other components into position. Movable components of the positioning frame can move in different directions. Some components can move vertically (e.g., along a Z-axis), substantially parallel with the legs of the mobile robotic frame. Other components can move horizontally along an X-axis, and yet others can move along the Y-axis that runs parallel with the movable components.

The mobile robotic frame, and potentially other supporting computing systems, can include processors that can use sensor data to determine whether the movements of the positioning system can allow the one or more robotic arms to reach a particular position of the workpiece from the current location of the outer frame. If the location is achievable, the processors control the positioning system and the robotic arms to the desired position. However, if the processors determine that a desired location and orientation of the arms is not reachable using the range of motion of the positioning system and the arms, the processors can cause the mobile robotic frame to navigate to a new location where the robotic arms can reach the desired position.

The mobile robotic frame can include the ability to autonomously maneuver over and around a workpiece and reposition individual objects on the workpiece while maintaining stability. For example, the mobile robotic frame can include a braking/anchor component that settles the movement of the mobile robotic frame while the robotic arms move with accurate positioning and engage the workpiece. Additionally, the legs, the braking/anchor component, and the movable components can counter the weight exerted by the one or more robotic arms to ensure the mobile robotic frame does not tilt or move while the robotic arms engage the workpiece. Alternatively, movement may be required while the robotic arms engage the workpiece. For example, the mobile robotic frame may be required to move to avoid obstacles or other mobile robotic frames. As such, the mobile robotic frame can move as the one or more robotic arms reposition themselves to remain engaged with the workpiece.

In some implementations, the mobile robotic frame can receive an instruction from an end user or operator. The end user or operator can instruct the mobile robotic frame to perform a particular task for engaging the workpiece. The instruction can provide information regarding the envelope or size of the workpiece, a type of action to perform on a specific portion of the workpiece, a location of the workpiece, and specific settings for each of the mobile robotic frame components. Using the instructions from the end user, the mobile robotic frame can perform the instructed task and provide an indication to the end user in response to completing the task.

To perform a task, an end user or operator may employ multiple mobile robotic frames to work over a particular workpiece. The mobile robotic frames can communicate with one another to accomplish a task, coordinating their positions and tasks to allow concurrent work by different mobile robotic frames on different portions of the task. Each mobile robotic frame can include inward-facing sensors and outward-facing sensors that allow for working on the task while avoiding obstacles. For example, the inward-facing sensors, located on the interior of each of the legs of the mobile robotics frame, can detect positioning within the workpiece space while the exterior sensors, located on the exterior of each of the legs of the mobile robotic frame, can detect positioning with relation to objects external to the mobile robotic frame in order to avoid collision. The sensors enable individual mobile robotic frame to complete their tasks while helping multiple mobile robotic collectively work together to accomplish tasks on a workpiece.

The mobile robotic frame provides various benefits over typical stationary frame systems. For example, the mobile robotic frame can maneuver itself based on the data provided by one or more sensors. The mobile robotic frame may move autonomously to avoid collisions or to reposition itself over the workpiece. The mobile robotic frame can also translate a robotic arm in three dimensions, which can allow the entire range of motion of the robotic arm to be shifted, allowing a much greater effective range than robotic arms are anchored at a fixed location. The mobile robotic frame provides the versatility to engage with workpieces that include hard-to-reach areas.

Other embodiments of these and other aspects of the disclosure include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
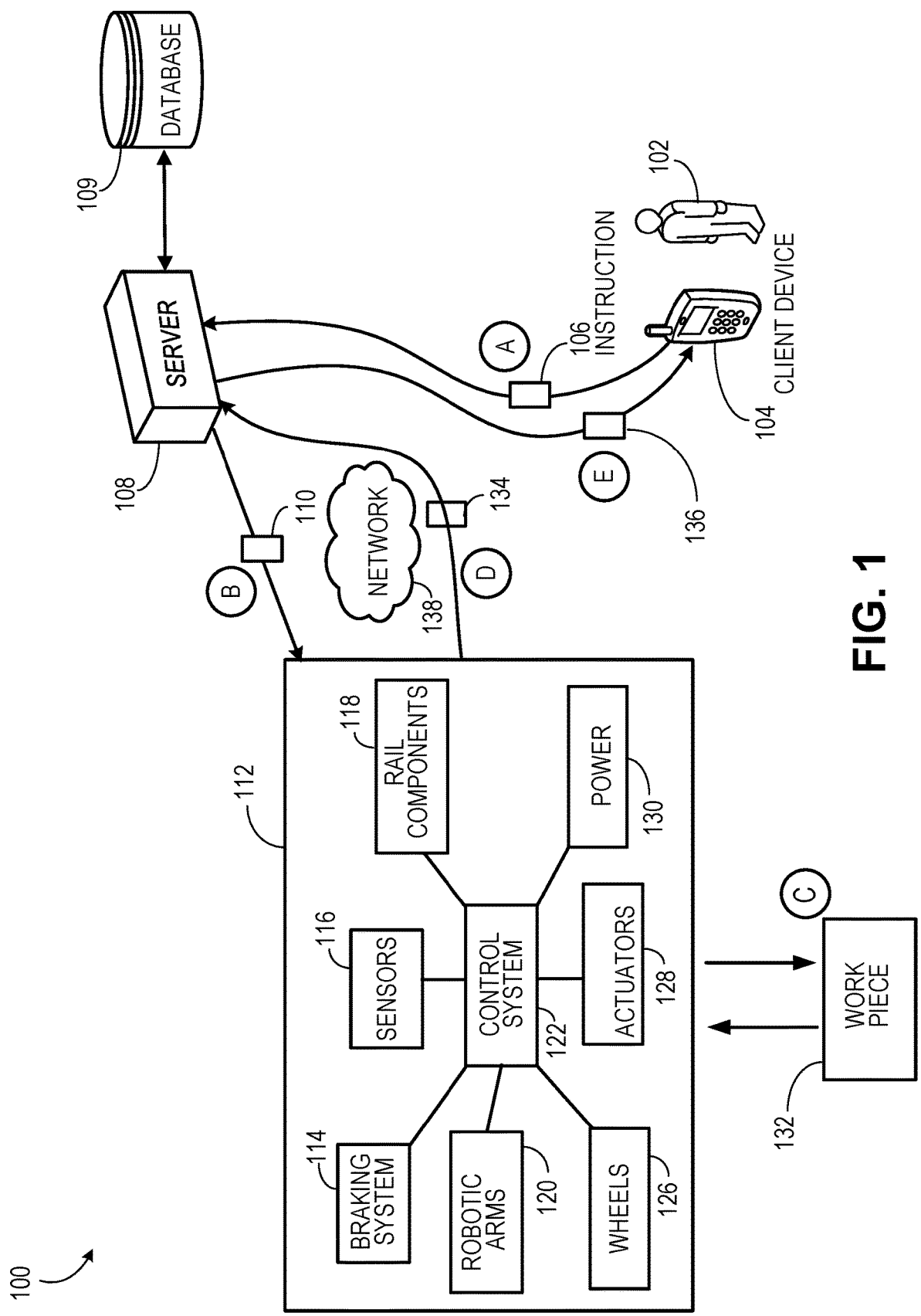
FIG. 1 is a block diagram that illustrates an example of a system that includes a mobile robotic frame.

FIG. 1 is a block diagram that illustrates an example of a system 100 for a mobile robotic frame 112 and corresponding components. The system 100 includes a client device 104, a server 108, a database 109, a network 138, and a mobile robotic frame 112. In the example, the system physically manipulates a workpiece 132. The example shows a user 102 interacting with the mobile robotic frame 112 through the client device 104. The example of FIG. 1 shows a single mobile robotic frame 112 interacting with a workpiece 132, however, the same techniques can be used with multiple mobile robotic frames and/or multiple workpieces. FIG. 1 illustrates various operations in stages (A) to (E), which can be performed in the sequence indicated or in another sequence.

In general, a mobile robotic frame can be large mobile autonomous frame that has the ability to span (e.g., extend over) large workpieces to perform automated manufacturing tasks. The mobile robotic frame can be used to perform tasks that cannot be reached effectively by fixed automation systems. For example, a mobile robotic frame may be capable of moving components to different locations across significant distances and without requiring predetermined paths to be defined. Additionally, the mobile robotic frame includes the capability to repair, replace, or fix the physical elements of the workpiece by arranging and/or manipulating the physical elements of the workpiece. The mobile robotic frame can also examine hard to reach places on a workpiece that a user may not typically be able to view without the help of additional equipment. The mobile robotic frame can take one or more actions without the use of receiving input from a user or from a user's client device. Although, the mobile robotic frame can move to a desired location and perform a specific task based on the received input, the mobile robotic frame can initiate actions based on data received from the mobile robotic frame's internal and outward-facing sensors.

The mobile robotic frame can include one or more components for interacting or physically manipulating with a workpiece found in the system 100. For example, the mobile robotic frame can include one or more robotic arms. Each of the one or more robotic arms can include an arm that can move in 6 degrees-of-freedom (DOF) and can include an end effector, such as an actuator that allows the robotic arm to grasp a physical object. For example, the actuator can include a clamp-like component or finger-like components to grasp and release objects. Each robotic arm can include one or more joint components that allow the robotic arm to rotate in any desired direction in the six DOF. The arms can be connected to each of the movable components in mobile robotic frame. For example, each movable component can include three robotic arms for a total of six robotic arms connected to the mobile robotic frame. Of course, the mobile robotic frame can include more or fewer than six robotic arms.

The mobile robotic frame can include a motorized outer frame and a positioning assembly. The motorized outer frame can provide a strong, stable framework and often has a fixed shape. The positioning assembly is coupled to the outer frame and provides multi-dimensional movement of the robotic arms, separate from the movement that the robotic arms are themselves capable of. For example, the positioning assembly can use rails, pulleys, and other movable elements to move a robotic arm into a desired location over the workpiece.

Additionally, the outer frame can include one or more legs of the mobile robotic frame. For example, each leg of the mobile robotic frame connects to an upper portion outer frame, such as a top-most portion of the mobile robotic frame, where the positioning assembly is attached. In another example, the positioning assembly can connect to a different portion of the outer frame, such as mid-points of the legs of the outer frame.

In some implementations, the outer frame connects to rails 118 of the positioning assembly. For example, the rail 118 can include one or more fixed components that remain in a fixed position relative to the outer frame. The rail components can also include one or more movable components, for example, that can move along the fixed rails. In some implementations, the one or more fixed components are positioned atop of the outer frame and the one or more movable components are positioned below the outer frame.

The positioning assembly can include one or more pulleys that connect to the movable components that move along the rails 118. For example, the one or more fixed components can define a groove that extends parallel to the direction of the fixed components (e.g., in a horizontal or "X" direction). A portion of the positioning assembly, including pulleys having ropes or cables, can move along the rails 118, which allows movement in a first direction (e.g., the X direction). Additionally, the pulleys can let out line or retract line connected to other components of the positioning assembly. This can allow other movable components to move vertically (e.g., in the "Z" direction), substantially parallel to the one or more legs of the robotic frame. Thus, with the rails 118 and pulleys that travel along the rails, adjustments can be made in two orthogonal directions, X and Z. Translation along a third orthogonal direction, Y, is also achieved using including rails or similar component on the elements moved up and down by the pulleys. For example, the movable components that the pulleys raise and lower can include a groove that a robotic arm can travel along. That is, the attachment mechanism coupling a robotic arm to the positioning assembly can travel in the Y direction along a track in the components that are raised or lowered in the Z direction, and the pulleys or other devices coupling to the rails 118 can travel along the X direction. Thus, the positioning assembly of the mobile robotic frame 112 allows for three-dimensional movement of the rail components 118.

The mobile robotic frame 112 includes one or more robotic arms 120. As previously mentioned, the robotic arms 120 are connected to the movable components 118. For example, each of the robotic arms 120 connect to the movable components to maneuver along the groove of the movable components. Additionally, the outer frame of the mobile robotic frame 112 allows for each of the robotic arms 120 to move in a 3-dimensional space by maneuvering the pulleys and other components of the positioning assembly. The outer frame can support the positioning of the robotics arms 120 to engage with a particular component of the workpiece. Additionally, the mobile robotic frame 112 can include any appropriate number of robotic arms 120, e.g., 1, 2, 6, 10, and so on.

In some implementations, the mobile robotic frame 112 can include wheels 126 and a braking system 114 that facilitate movement between locations. For example, leg of the mobile robotic frame 112 can have a wheel at the end. As part of the outer frame, the legs connect to the positioning assembly at the top and to the wheels at the bottom (see FIG. 2A). In some implementations, the wheels 126 can each swivel or rotate about an axis. For example, a wheel that connects to one of the legs can rotate to move the mobile robotic frame 112 and can move 360 degrees about the axis of the connected leg.

The mobile robotic frame 112 can include a control system 122. The control system 122 can include one or more processors that generate control instructions for the mobile robotic frame 112. The control system 122 can determine a desired location to move the mobile robotic frame 112. The control system 122 then powers the one or more wheels 126 to move the mobile robotic frame 112 to the desired location. In some implementations, the control system 122 receives data from one or more sensors 116, which can include one or more cameras, and one or more received instructions to move the mobile robotic frame 112 to the desired location.

The one or more sensors 116 can include cameras, light sensors, sound sensors, temperature sensors, contact sensors, proximity sensors, distance sensors, pressure sensors, tilt sensors, navigation GPS positioning sensors, acceleration sensors, and one or more gyroscope sensors, to name a few examples. The mobile robotic frame 112 can use data provided from each of the sensors to determine the nature of the workpiece 132 and the surrounding environment, and using the information to determine desired positions for the rail components 118, the robotic arms 120, and the wheels 126. The sensors 116 can be placed on legs of the mobile robotic frame 112 with some sensors 116 facing outward from the frame 112 and some sensors 116 facing inward, e.g., toward a working volume within the frame 112.

The control system 122 can also use data from sensors 116 such as cameras to maneuver the mobile robotic frame 112 and avoid obstacles. The one or more cameras can provide media data, such as video and/or images, back to the control system 122, which can apply one or more recognition algorithms, such as object recognition. Based on any detected objects from the data provided by the sensors 116 or the data provided by the cameras, the control system 122 can adjust the location of the mobile robotic frame 112 and/or positioning of the positioning assembly and robotic arms.

The control system 122 may receive an instruction from user 102 to move the mobile robotic frame 112 to a desired location, such as a location centered over a portion of the workpiece 132. For example, the user 102 can interact with his/her client device 104 to transmit an instruction to the mobile robotic frame 112. Alternatively, the user 102 can interact with a user interface on the mobile robotic frame 112. The instruction may indicate where the mobile robotic frame should travel to in any of multiple ways, such as: GPS coordinates for the desired workpiece 132, a task involving a certain part of a workpiece 132, a type of the workpiece 132, a particular function/task to perform associated with the workpiece 132, a size and/or dimensions of the workpiece 132, and other characteristics describing the workpiece 132 or a portion thereof.

The control system 122 can use data received from the one or more sensors 116 that indicate a position of the mobile robotic frame 112 in relation to the workpiece 132 and other external objects, such that no collisions occur and the mobile robotic frame 112 positions itself at the desired location over the workpiece. For example, the one or more sensors 116 include one or more outward-facing sensors, facing outward from the mobile robotic frame 112, and one or more inward-facing sensors facing toward the space within the mobile robotic frame 112.

The data from outward-facing sensors can be used to detect objects to ensure that the mobile robotic frame 112 does not collide with another object, such as another mobile robotic frame 112 or an external object. The data from the outward-facing sensors can also be used to detect landmarks on the workpiece 132, which are used to guide the mobile robotic frame 112 into the correct position with respect to the workpiece 132.

The control system 122 can also monitor the data provided by inward-facing sensors to determine whether an object is located within a space between the legs of the mobile robotic frame 112. Additionally, the inward-facing sensors can be used to fine-tune the position of the mobile robotic frame 112 relative to the workpiece 132 and to determine positions of the positioning assembly and robotic arms.

The control system 122 can store information indicating the range of motion of each of the robotic arms 120 as well as the range of motion of the positioning assembly. The control system 122 can assess, for a given position of the frame 112, whether the robotic arms 120 have the ability to reach the workpiece 132. If the control system 122 determines the robotic arms 120 do not have the ability to reach the workpiece 132 from its current position, even with the additional range provided by the positioning assembly, the control system 122 can instruct the actuators 128 connected to the wheels to move the mobile robotic frame 112 to a desired location (e.g., in an X, Y, and Z dimension) so that at least one of the robotic arms 120 can engage the particular component of the workpiece 132. If the control system 122 determines that the robotic arms cannot reach the desired position currently, but could within the range of motion of the positioning assembly, the control system 122 instructs actuators of the positioning assembly so that the robotic arms 120 can engage the workpiece 132 as needed.

Additionally, the data provided by the one or more cameras can be used to determine whether the mobile robotic frame 112 is correctly positioned (e.g., centered) over the workpiece 132 and if the one or more robotic arms 120 can reach the workpiece 132. The one or more cameras can provide media (e.g., video and image) data that the control system 122 can use to determine a distance to the workpiece 132. For example, the control system 122 can execute one or more recognition algorithms, such as object recognition and distance analysis, on the media received from the cameras to determine whether the control system 122 is positioned in the desired location. If the control system 122 determines from the media data that the mobile robotic frame 112 is not in the desired location, the control system 122 can move the wheels 126 (e.g., to move the mobile robotic frame 112) and the actuators 128 (e.g., to move positioning components along the rail components 118) to a desired location for the robotic arms 120 to engage with the workpiece 132.

The mobile robotic frame 112 also includes one or more power components 130. In some instances, the one or more power components 130 can include batteries, photovoltaic cells, fuel cells, or can plug into an outlet. The one or more power components 130 can include a combination of each of these power types to power the mobile robotic frame 112. For example, the power components 130 can provide power (e.g., voltage and current) to the control system 122 to execute the processing, to the braking system 114 to apply the brakes when instructed by the control system 122, to power each of the one or more sensors 116, and to the robotic arms 120 so they can maneuver to engage the workpiece 132. Additionally, the power components 130 can provide power to the one or more cameras, to the actuators 128 to move the rail components 118, and to the rail components 118 to allow the robotic arms 120 slide along grooves. In some implementations, the power components 130 can first provide power to the control system 122. The control system 122 can include a power divider that is configured to provide a particular power amount to the other components based on their corresponding power requirements. Thus, the power provided by the power components 130 should be configured to provide power to each of the other components in the mobile robotic frame 112.

The server 108 may include one or more computers connected locally or over a network, such as network 138. The server 108 can communicate with the database 109. The database 109 can include multiple forms of data, such as, previous instructions provided to mobile robotic frame 112 and other mobile robotic frames; locations of previous workpieces; configurations corresponding to the cameras and the sensors 116; blueprints of previous workpieces; and media data corresponding to previous engagements to workpieces by previous mobile robotic frames. The control system 122 can access the data in the database 109 and use the data to set configurations of the mobile robotic frame 112. Additionally, the control system 122 can retrieve a location and dimensional data of the workpiece 132 to determine how to engage the workpiece.

During stage (A), a user 102 interacts with the client device 104 to transmit an instruction 106 to the mobile robotic frame 112. For example, the user 102 can speak/type a command to the client device 104, e.g., "Please remove the engine from the vehicle." The spoken/typed command can include various types of phrases and/or instructions directed towards the mobile robotic frame 112. The instruction 106 is first provided to the server 108. If the server 108 does not understand the command, the server 108 can transmit a notification to the client device 104 in response requesting for a new instruction. For example, the server 108 can process the spoken command using speech recognition to determine the context of the instruction. If the command is a typed commend, the server 108 can process the command using contextual recognition to determine the context of the instruction. The server 108 can look up how to perform the requested task and provide instructions 110 to the mobile robotic frame 112.

During stage (B), the control system 122 processes the received instructions 110. For example, the control system 122 identifies which workpiece 132 to act on and determines the desired task for engaging with the desired workpiece 132. In this example, the mobile robotic frame 112 can determine that it is to remove an engine from a vehicle.

During stage (C), the control system 122 engages the workpiece 132 as directed by the instructions 110. For example, the control system 122 first analyzes the location of the workpiece 132 to determine how to move the mobile robotic frame 112 into position. For example, the location of the workpiece 132 may be described by a geographical locational coordinate, such as −29.1852° N, 81.0705° W. In some implementations, the mobile robotic frame 112 may initially be in close proximity to workpiece 132 and only require small movements to further move and center over a portion of the workpiece 132. For example, the mobile robotic frame 112 may be located in a warehouse or a factory near the workpiece 132. In other implementations, the mobile robotic frame 112 may be located farther away from the workpiece 132 that requires larger movements. For example, the mobile robotic frame 112 can be located in a garage while the workpiece 132 is located external to the garage. In this example, the mobile robotic frame 112 would be required to autonomously move from its location in the garage to the external location where the workpiece 132 is located.

The control system 122 can use one or more of its components to move the mobile robotic frame 112 to position itself over the workpiece 132. For example, the control system 122 can use the one or more sensors 116, including cameras, to guide the movement of the mobile robotic frame 112. For example, using a GPS device and an accelerometer, the control system 122 can guide the mobile robotic frame 112 to the GPS locational coordinates of the workpiece 132. To move the mobile robotic frame 112, the control system 122 provides instructions to the wheels 126 to follow a particular path that reaches a destination of the location of the workpiece 132. While the mobile robotic frame 112 travels to the location of the workpiece 132, the control system 122 can use the data provided by the sensors 116 (e.g., external and inward-facing sensors) and cameras (e.g., video data) to avoid any obstacles and move along the path to the destination clear of collision. Once the control system 122 determines that the mobile robotic frame 112 has reached the workpiece 132 (e.g., by determining a distance between the GPS coordinates of the location of the workpiece 132 to the location of the mobile robotic frame 112 is within a predetermined threshold) the control system 122 proceeds to perform coarse tuning of the mobile robotic frame 112's location. In some implementations, the control system 122 can provide offline feedback data to move the mobile robotic frame 112. The offline feedback data can be retrieved from the database 109 and provided to the mobile robotic frame to move the components of the mobile robotic frame 112.

The control system 122 positions the mobile robotic frame 112 over a portion of the workpiece 132. In order to center the mobile robotic frame 112 over the workpiece 132, the control system 122 can move so that the legs straddle the workpiece 132. The control system 122 can use the data provided by the sensors 116 that monitor the area between the mobile robotic frame 112's four legs to autonomously move to a location of the center of the workpiece 132.

In some implementations, the user 102 can interact with the client device 104 to control the coarse-tuning of the mobile robotic frame 112's movement. The user 102's control allows for moving the position of the mobile robotic frame 112 based on viewing a real time video feed from a camera 124. Additionally, the user 102 may be within proximity to the mobile robotic frame 112 (e.g., standing underneath or next to the mobile robotic frame 112), such that the user can control the movement of the mobile robotic frame 112 through the client device 104 and use his/her own viewing position to ensure the mobile robotic frame 112 correctly aligns over the workpiece 132.

Once the mobile robotic frame 112 is placed over the workpiece 132, the control system 122 engages the braking system 114 to ensure the mobile robotic frame 112 is stationary and does not move during the engagement with the workpiece 132. In some implementations, the control system 122 considers stability of the mobile robotic frame 112 when the workpiece 132 is engaged. For example, the control system 122 can ensure stability by identifying undesirable movements of the mobile robotic frame 112 that may be generated when the robotic arms 120 lifts the workpiece 132 or by some other external force. The undesirable movement can be a slide, a tipping over, or some other undesirable movement of the mobile robotic frame 112. If the control system 122 identifies this undesirable movement, the control system 122 can move various components of the mobile robotic frame 112, such as the rail components 118, wheels 126, and robotic arms 120, to counter the undesirable movement. The control system 122 can instruct these components to move in a manner that moves the overall mobile robotic frame 112 in a direction that opposes the undesirable movement. By moving the mobile robotic frame 112 in the direction that opposes the undesirable movement, the control system 122 can ensure of the mobile robotic frame 112's stability while engaging with the workpiece 132.

The control system 122 engages the actuators 128, the rail components 118, and the robotic arms 120 to engage the workpiece 132. For example, in response to the control system 122 determining that the mobile robotic frame 112 is correctly placed over the workpiece 132, the control system 122 moves the rail components 118 and robotic arms 120 to enable the robotic arms to reach the workpiece 132. For example, the control system 122 can use data provided by the cameras and the sensors 116 to determine if the robotic arms 120 can reach the workpiece 132.

If the control system 122 determines the robotic arms 120 cannot reach the workpiece, based on the height of the outer frame and the range of motion or reach of the robotic arms 120, the control system 122 instructs the actuators of the positioning assembly to translate the robotic arms into a better position.

After the control system 122 determines the robotic arms 120 can reach the desired location on the workpiece 132, the control system 122 instructs the robotic arms 120 to engage the workpiece 132 and perform the desired task transmitted by the user 102. In some implementations, during the process of engaging the workpiece 132 to perform the task, the robotic arms 120 may need to move to a different location on the workpiece 132 or may need to place a component of the workpiece 132 outside the space of the mobile robotic frame 112. The control system 122 can instruct the robotic arms 120 to automatically retrieve the component and instruct the actuators 128, the rail components 118, and the robotic arms 120 to collectively work together to move the component off the workpiece 132 to a location outside of the inner space between the legs of the mobile robotic frame 112. In addition, the control system 122 can use the data provided by the cameras and the data provided by the one or more sensors 116 to determine how to move the component (e.g., such as the engine) from the workpiece 132 safely without being obstructed by external objects.

The control system 122 can engage the grips of the robotic arms 120 to retrieve the component from the workpiece 132. For example, the grips of the robotic arms 120 can be clamp-like grips or finger-like grips that have the ability to grab heavy items. In other examples, the grips of the robotic arms 120 can be large magnets with the ability to hold one or more heavy pieces of metal. Additionally, the grips of the robotic arms 120 can be pallet forks, snow-blowers, plows, digging buckets, or large vice grips. In some implementations, the ends of the robotic arms 120 can include an interchangeable connector that allow a user to quickly and efficiently change the end component from the robotic arms 120 based on the required task. For example, if the user 102 requires the mobile robotic frame 112 to remove an engine from the workpiece 132, the user 102 may place a large magnet at the end of the robotic arms 120. In another example, if the user 102 requires the mobile robotic frame 112 to scoop out dirt or snow from a particular portion of the ground, the user 102 may place a digging or scooping bucket at the end of each of the robotic arms 120. In another example, one of the robotic arms can be camera while another robotic arm can be a grip for moving objects. Thus, the robotic arms can include a different end component for a particular task.

Additionally, the robotic arms 120 can rotate in various degrees of freedom. In one example, the robotic arms 120 can move in 6 degrees of freedom in a three-dimensional space. Thus, the robotic arms can move forward, backward, up, down, left, and right combined with the ability to rotate about three perpendicular axes (e.g., X-Y-Z axes), such as pitch, roll, and yaw. By allowing the robotic arms 120 to maneuver in the various degrees of freedom, the robotic arms 120 can access hard to reach places for corresponding workpieces.

In some implementations, the mobile robotic frame 112 may perform work on a particular component of the workpiece 132 while other mobile robotic frames are working on other areas of the workpiece 132. The mobile robotic frames can communicate with one another to ensure that no collisions occur between the mobile robotic frame systems. The control systems can employ one or more collision avoidance algorithms, such as motion planning algorithms, probabilistic roadmap, and rapidly-exploring random tree algorithms. Additionally, the control systems corresponding to respective mobile robotic frame systems can use data provided by respective outward-facing sensors to ensure each mobile robotic frame system avoids one another while working on their respective portion of the workpiece. If the control system for a first mobile robotic frame determines that it is within a predetermined distance from a second mobile robotic frame while working on a particular workpiece, the first control system can move its mobile robotic frame away by the predetermined distance.

A control system corresponding to a particular mobile robotic frame can utilize path planning and collision avoidance algorithms when engaging a workpiece 132 with multiple mobile robotic frames. A control system can employ one or more path planning algorithm to ensure that its particular mobile robotic frame engages a first predetermined portion of the workpiece 132. Another control system can utilize a path planning algorithm to ensure that its particular mobile robotic frame engages a second predetermined portion of the workpiece 132. The first predetermined portion and the second predetermined portion may or may not overlap with one another. For example, the control system can utilize path planning algorithms such as probabilistic roadmap, A* search, and D* search. One of the control systems discussed herein, or another control system, also may employ path planning and collision avoidance algorithms, such as the algorithms disclosed herein, to program the robotic arms of a mobile robotic frame to avoid collisions and path conflicts when operating on a particular workpiece.

During stage (D), in response to finishing the task of engaging with the workpiece 132, the control system 122 formulates a notification 134 to transmit to the client device 104 indicating that the task is complete. The notification 134 can include: a start time for the task, a stop time for finishing the task, the amount of time taken by the control system 122 to determine the task is complete, a description of the task, one or more media from the cameras before, during, and after the task, as well as data from the one or more sensors 116. The notification 134 can also include the blueprint utilized by the control system 122 to perform the task. Additionally, the notification 134 can include data indicating the user that instructed the task, a location in coordinates of the workpiece 132, current settings for each of the components of the mobile robotic frame 112. In some implementations, the control system 122 can determine whether the amount of time taken for completing this task has sped up or declined from a previous task of a similar type.

The control system 122 transmits the notification 134 to the server 108 over the network 138. The server 108 stores the notification 134 in the database 109 for historical loggings. The server 108 may recall at a later point in time this completed task for this particular workpiece 132 a next subsequent time a user instructs the mobile robotic frame 112 to complete a similar task.

During stage (E), the server 108 transmits a notification 136 to the client device 104 indicating that the task on workpiece 132 has completed and the data corresponding to the task has been stored in the database 109 for logging purposes. The client device 104 can display to the user that the task has completed and request whether the user 102 desires to complete a new task corresponding to this workpiece 132 or another workpiece. The user 102 can interact with his/her client device 104 to indicate that no more tasks are to be completed or to indicate a new task.

Figure 2A:
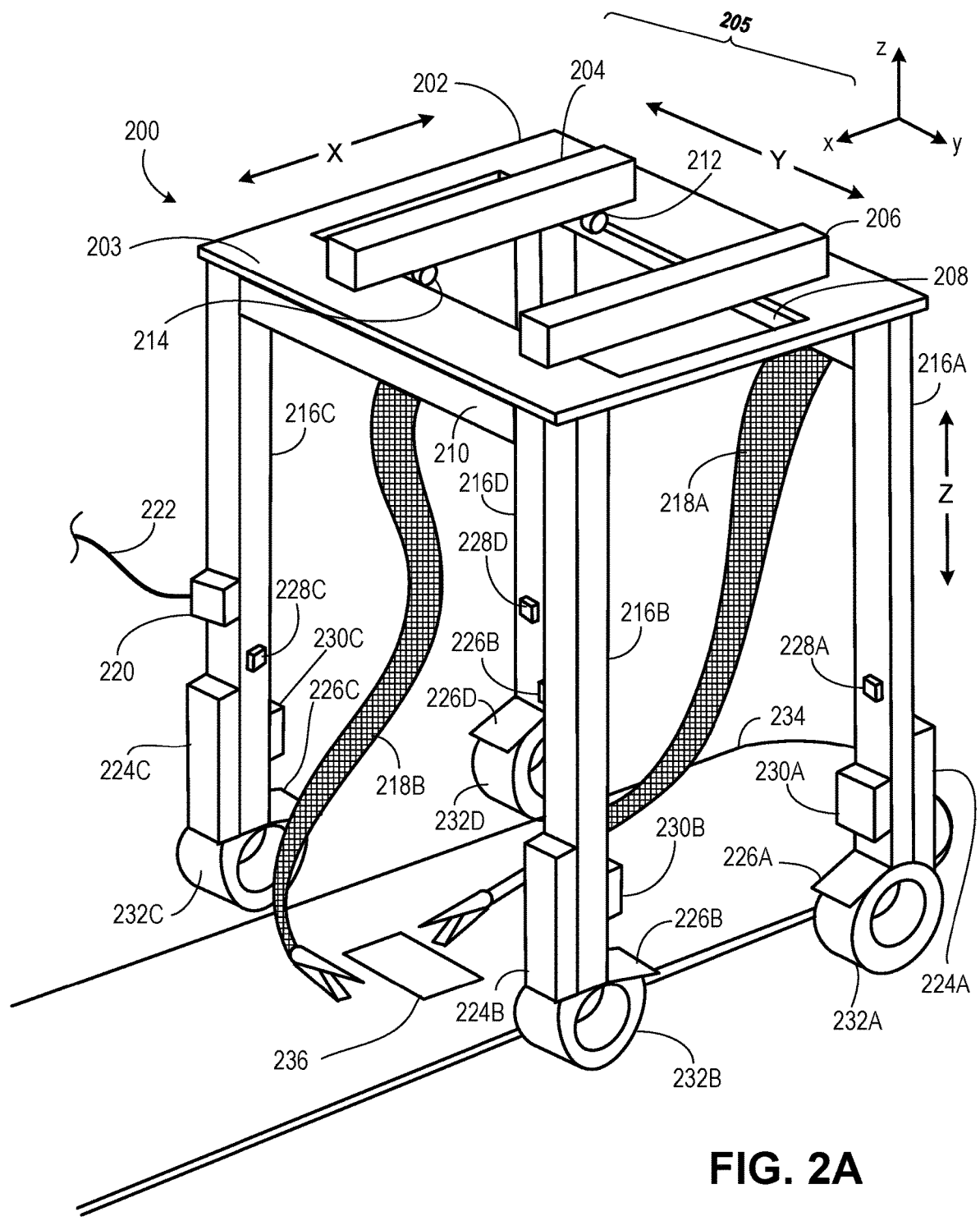
FIGS. 2A-2D are perspective views of an example of a mobile robotic frame and a workpiece.

FIG. 2A is a perspective view of an example of a mobile robotic frame 200 and a workpiece 234. In some implementations, the mobile robotic frame 200 includes various components that allow for autonomously moving to engage a workpiece.

The mobile robotic frame 200 has a motorized outer frame 202 that includes legs 216A-216D, connected by beams or other framework 203 at or near the top of the legs 216A-216D. Each of the legs 216A-216D connects to a corresponding wheel 232A-232D. Each wheel 232A-232D can have a corresponding braking component 226A-226D that is engaged when a control unit, such as control system 220, desires for the wheels to stop rotating.

The mobile robotic frame 200 includes a positioning assembly 205 that is attached to the outer frame 202. The positioning assembly 205 can translate the base or connection point of a robotic arm within the frame 200, along three orthogonal axes, to extend the effective reach of the robotic arm. The positioning assembly 205 includes two fixed guides 204 and 206, and two movable guides 208 and 210. The fixed and movable guides 204, 206, 208, and 210 can be, for example, rails, guides, or beams, to name a few examples. The fixed guides 204, 206 are extend along the X axis and are fixed in position with respect to the outer frame 202. Moveable components 212, 214 can travel along the fixed guides 204, 206 in a direction along the X axis. In the example, the moveable components 212, 214 include pulleys that connect to the movable guides 208, 210 to adjust the height of the movable guides 208, 210 along the Z axis. The movable guides 208, 210 extend along the Y axis, and the connection points for robotic arms 218A, 218B move along the movable guides 208, 210. As a result, the positioning assembly 205 allows the entire robotic arms to move in the X, Y, and Z axes within the frame 112.

FIG. 2A also illustrates an X-Y-Z dimensional axis to show how the mobile robotic frame 200 moves along each axis. The fixed components 204 and 206 lie parallel to the X-axis. The movable components 208 and 210 lie parallel to the Y-axis. The legs 216A-216D lie parallel to the Z-axis.

In some implementations, legs of the mobile robotic frame 200 can include components that allow that mobile robotic frame 200 to autonomously navigate to and over the workpiece 234. For example, each of the legs 216A-216D can include one or more inward-facing sensors 228A-228D, one or more outward-facing sensors 224A-224D, and a stopping component 230A-230D.

In some implementations, at least one of the legs 216A-216D of mobile robotic frame 200 can include a control system 220 and a power supply 222. For example, as illustrated in FIG. 2, leg 216C includes the control system 220 and a power supply 222. In some implementations, each of the legs may include a control unit that communicates with the sensors found on that leg. In other implementations, the mobile robotic frame 200 may include only one control system 220 that communicates with each of the components on the mobile robotic frame 200. The control system 220 can communicate with each of the components in mobile robotic frame 200 wireless or through a wire. For example, the control system 220 can communicate with the fixed components 204 and 206, the movable components 208 and 210, each of the robotics arms 218, each of the internal and outward-facing sensors 224 and 228, along with each of the wheels 232. Additionally, the control system 220 can communicate with one or more external devices, such as a user's client device, to relay instructions from the client device to one or more components of the mobile robotic frame 200. Likewise, the control system 220 can relay data from the one or more components of the mobile robotic frame 200 to the user's client device, for example, such as media data, while the mobile robotic frame 200 engages with the component 236 of the workpiece 234.

In some implementations, the mobile robotic frame 200 can engage with different components of workpiece 234. For example, as illustrated in FIG. 2A, the mobile robotic frame 200 engages with a component 236 of the workpiece 234. The component can be, for example, an electrical component, a pipe, a block of wood, or a cement block, to name a few examples. For example, the mobile robotic frame 200 uses the robotic arms 218 to engage the component 236 of the workpiece 234. Each of the robotic arms 218 connect to the movable components 208 and 210. For example, the robotic arms 218 can fit in a groove in the movable components 208 and 210. The groove extends from one end of the movable component to the other end. A robotic arm, such as robotic arm 218B, can slide along the groove of the movable component 210 to access a particular location on the workpiece 234.

Additionally, the outer frame 202 and the fixed components 204 and 206 acts as brace supports for the movement of the movable guides 208 and 210, and the robotic arms 218A and 218B. For example, each of the fixed guides 204 and 206 has one or more movable components, such as pulleys 212 and 214, which connect the fixed guides to the moveable guides. For example, as illustrated in FIG. 2A, the pulley 214 connects to the bottom of fixed guide 204 and spools out line that connects to the top of the movable component 210. Likewise, the pulley 212 connects to the bottom of fixed guide 204 and spools out line that connects to the top of the movable component 208. The fixed guide 206 also has includes moveable components including pulleys that connect to the bottom of the fixed guide 206 and to the top of the movable component 210 and movable component 208.

Figure 2B:
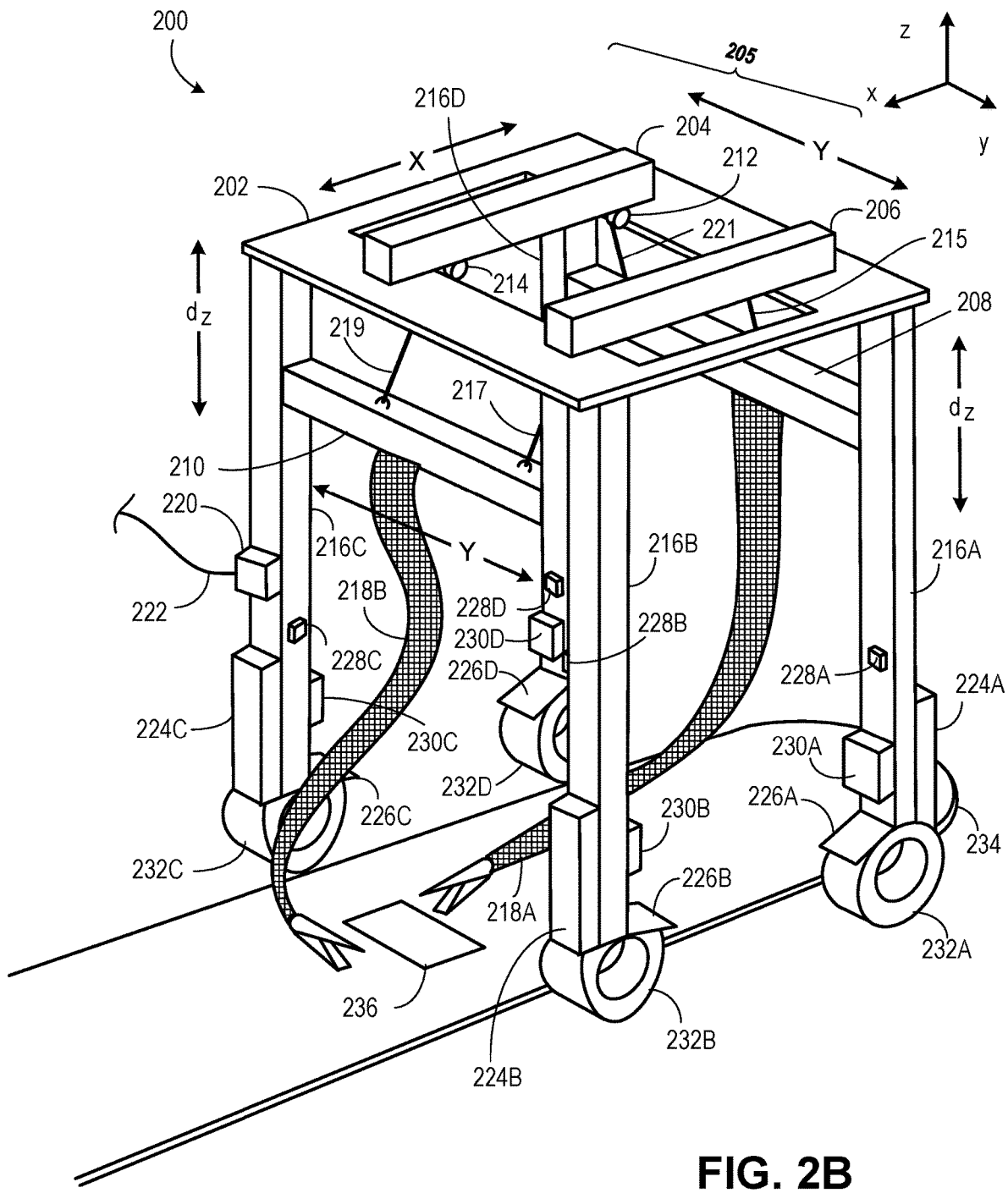

FIG. 2B is a perspective view of the mobile robotic frame 200 and the workpiece 234, showing a different position of the positioning assembly 205. The two movable components 208 and 210 move vertically in the Z-direction, as indicated by the change in Z direction ($d_z$). The control system 220 can instruct the pulleys 212 and 214 connected to the fixed guide 204 and other pulleys connected to fixed guide 206 to let out line that moves the movable components 208 and 210 downward, along the Z-direction. Additionally, the control system 220 can instruct the pulleys 212 and 214 connected to fixed guide 204 and other pulleys connected to fixed guide 206 to retract the line to move the movable components 208 and 210 upward, along the Z-direction. For example, pulley 212 lets out line 221, pulley 214 lets out line 219, while line 217 and 215 connect to the pulleys connected to movable component 206.

In some implementations, the control system 220 may instruct only a subset of the pulleys to move. For example, the control system 220 may instruct pulley 214 and the pulley connected to the fixed guide 206 to lower the movable component 210 while the pulley 212 and the other pulley connected to the fixed guide 206 to raise the movable component 208. This allows for each movable component (208 and 210) to be situated at different vertical heights in order to reach different components of a workpiece 234 that may have varying heights.

Figure 2C:
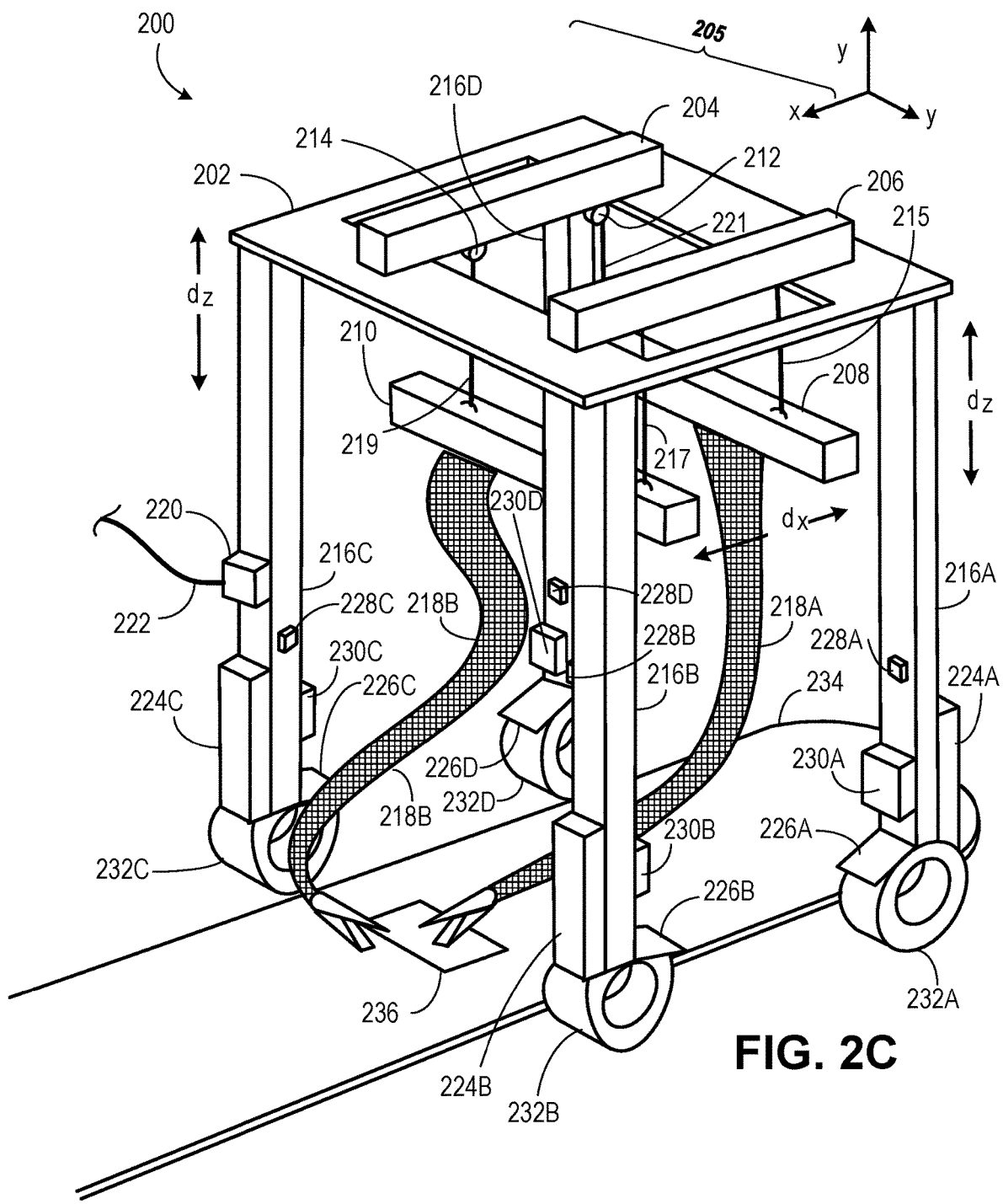

FIG. 2C is a perspective view of the mobile robotic frame 200 and the workpiece 234, showing a different position of the positioning assembly 205. FIG. 2C shows that, not only can the two movable components 208 and 210 move vertically in the Z-direction, in FIG. 2B, the pulleys can move along fixed guides 204 and 206 in the X direction, as indicated by the change in X direction ($d_x$).

In some implementations, the bottom of each of the fixed guides 204 and 206 includes one or more grooves. The one or more grooves allow the pulleys attached to the fixed components 204 and 206 to slide along the X direction (e.g., as indicated by the $d_x$) to a desired location. The control system 220 can move the pulleys to a desired location along the grooves. In some implementations, the control system 220 can move each of the pulleys independently. For example, pulley 212 may remain at the edge of the fixed guide 204 while pulley 214 is moved to the center of the fixed guide 204. Likewise, both pulleys under the fixed guide 206 can move independently of one another and independently of the pulleys under the fixed guide 204. Once the pulleys reach the control system 220's desired location along the groove, the pulleys can then release and/or retract their corresponding lines to move the movable components 208 and 210 along the Z-direction.

Figure 2D:
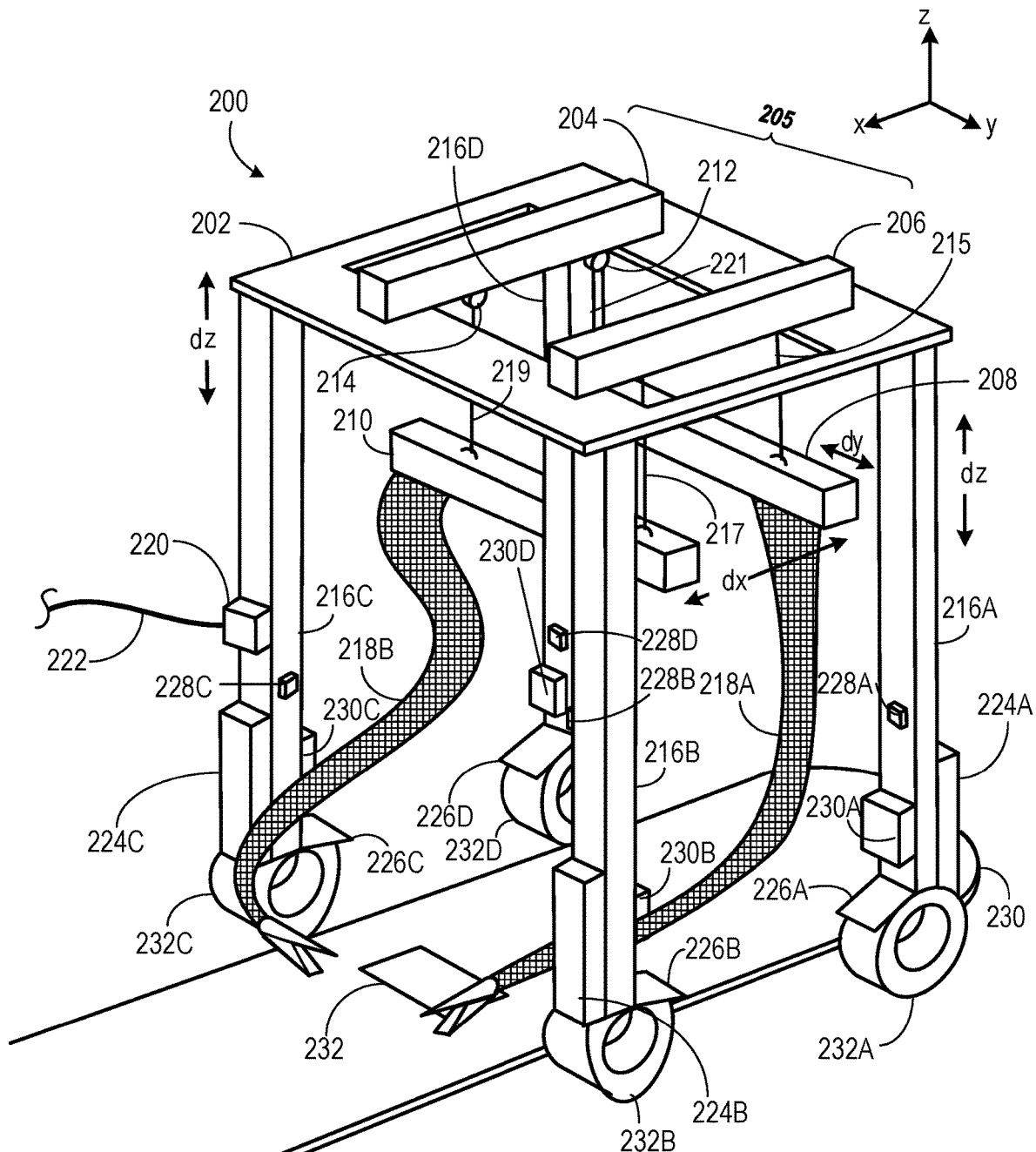

FIG. 2D is a perspective view of the mobile robotic frame 200 and the workpiece 234, with a different position of the positioning assembly. In addition to changes in the X direction and Z direction compared to FIG. 2A, the robotic arms 218A and 218B can change position along the Y axis, as the connection of the robotic arms to the movable components 208 and 210 moves along the Y-direction, as indicated by the change in Y-direction ($d_Y$).

For example, the bottom of each of the movable components 208 and 210 include one or more grooves that traverse the length of each of the movable components 208 and 210. The one or more grooves allow the robotic arms to slide along the Y-direction (e.g., as indicated by the $d_Y$) to a desired location. In some implementations, the control system 220 can move each of the robotic arms (e.g., 218A and 218B) independently of one another. For example, the control system 220 may move the robotic arm 218B to the edge of movable component 210 closer to leg 216C, whereas the control system 220 may move the robotic arm 218A to the edge of movable component 208 closer to leg 216A. Additional independent movements are possible by the robotic arms along the movable components.

Once the robotic arms reach the desired location along the groove of the corresponding movable guide 208, 210, the robotic arms 218A and 218B can maneuver in 6-DOF to engage the component 236 of the workpiece 234.

Figure 3:
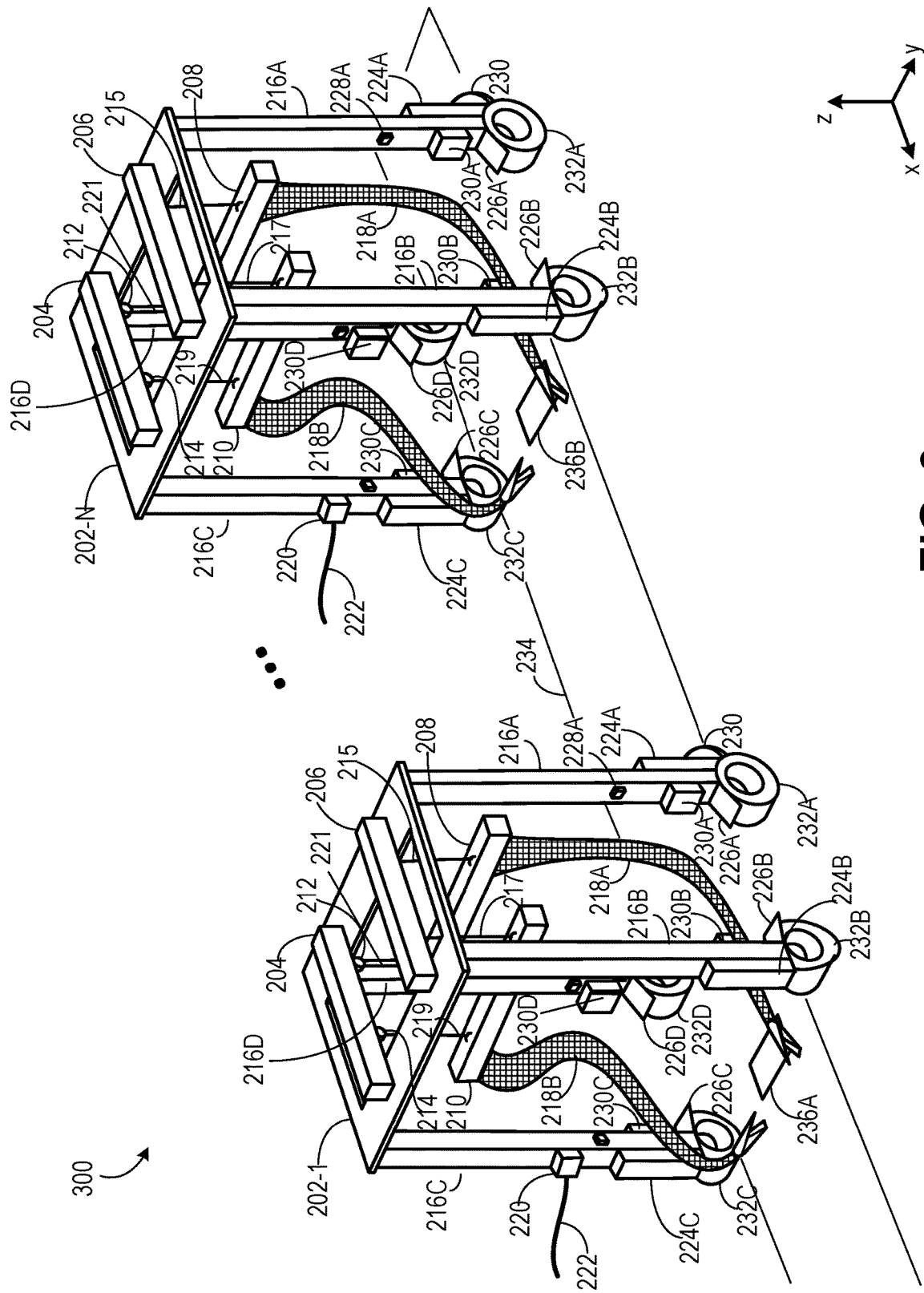
FIG. 3 is a perspective view that illustrates an example of multiple robotic frames engaging a workpiece.

FIG. 3 is a perspective view that illustrates an example of a system 300 for positioning multiple robotic frames over a workpiece. As illustrated in system 300, multiple mobile robotic frames can engage on a particular workpiece 234. For example, system 300 illustrates a mobile robotic frame 301 and a mobile robotic frame 302 that can engage with a component 236A and component 236B, respectively, of a workpiece 234.

In some implementations, the mobile robotic frames 301 and 302 can avoid collisions with one another through the use of the data provided by each of their corresponding sensors. The control systems can use sensor data corresponding to each of the mobile robotic frames to determine whether another mobile robotic frame is within proximity. If a control system determines from the sensor data that another mobile robotic frame is within proximity by comparing the proximity distance to a predetermined threshold, the control system can move the mobile robotic frame in the opposite direction and maintain engagement with the workpiece by adjusting the position of the robotic arms to counter the mobile robotic frame's movement.

Once one of the mobile robotic frame systems completes the task for a corresponding component 236, that mobile robotic frame system can transmit a notification to the other mobile robotic frame systems working on the workpiece 234 to indicate its completion. Once each of the mobile robotic frame systems have completed the task on the workpiece 234, each of the mobile robotic frame systems can transmit a notification to a server, such as server 108 of FIG. 1, indicating the task of engaging the workpiece 234 is complete.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the invention have been described. Other embodiments are within the scope of the following claims. For example, the steps recited in the claims can be performed in a different order and still achieve desirable results.

What is claimed is:

1. A mobile robot comprising:
   a motorized frame that is configured to travel to a location, the motorized frame comprising four legs that each have an upper portion and a lower portion, wherein the legs are coupled together by beams at the upper portions and wherein a three-dimensional working volume is located between the legs;
   a positioning assembly coupled to the motorized frame;
   a robotic arm having a manipulator, the robotic arm being coupled to one or more movable components of the positioning assembly that are movable with respect to the motorized frame;
   sensors coupled to the motorized frame, the sensors being configured to provide data indicating (i) positions of objects in the three-dimensional working volume and (ii) positions of objects outside the three-dimensional working volume in an environment of the mobile robot;
   a control system configured to process data from the sensors and provide control data to:
   (i) move the motorized frame to a predetermined position with respect to a workpiece in which the workpiece is located in the three-dimensional working volume, the movement being determined based on sensed positions of the workpiece indicated by the data from the sensors,
   (ii) adjust the one or more movable components of the positioning assembly, and
   (iii) move the robotic arm relative to the motorized frame;
   wherein the one or more movable components and the robotic arm are operable to position the manipulator at any position in the three-dimensional working volume with 6 degrees of freedom while the motorized frame remains at the location.

2. The mobile robot of claim 1, further comprising:
   one or more fixed components of the positioning assembly that are configured to remain in a fixed position relative to the motorized frame; and
   wherein one or more movable components of the positioning assembly are coupled to the one or more fixed components through one or more pulleys that can vary the position of the movable components relative to the one or more fixed components.

3. The mobile robot of claim 1, further comprising:
   one or more rails that are configured to remain in a fixed position relative to the motorized frame; and
   wherein one or more movable components of the positioning assembly include one or more components configured to travel along the one or more rails.

4. The mobile robot of claim 1, wherein the one or more sensors comprise:
   first sensors arranged to capture information indicating three-dimensional positions of objects external to the motorized frame; and
   second sensors arranged to capture information indicating three-dimensional positions of objects within the motorized frame.

5. The mobile robot of claim 1, wherein the positioning assembly is configured to translate the robotic arm along three mutually orthogonal directions within the motorized frame.

6. The mobile robot of claim 1, wherein the positioning assembly comprises a first component, a second component, and a third component, wherein:
   the first component is configured to move the second component, the third component, and the robotic arm along a first substantially horizontal axis;
   the second component is configured to move the third component and the robotic arm along a substantially vertical axis;
   the third component is configured to move the robotic arm along a second substantially horizontal axis that is orthogonal to the first substantially horizontal axis and the substantially vertical axis.

7. The mobile robot of claim 1, wherein the control system enables autonomous locomotion of the mobile robot;
   wherein the mobile robot comprises a tether configured to detachably couple to a power source; and
   wherein the working volume is an area at least ten feet by ten feet by ten feet.

8. The mobile robot of claim 1, wherein the sensors are configured to generate a point cloud indicating positions of objects in the three-dimensional working volume, the three-dimensional working volume being a continuous three-dimensional space encompassed by the motorized frame.

9. A method comprising:
   navigating a mobile robot to a location, the mobile robot comprising:
     a motorized frame comprising four legs that each have an upper portion and a lower portion, wherein the legs are coupled together by beams at the upper portions and wherein a three-dimensional working volume is located between the legs;
     a positioning assembly coupled to the motorized frame; and
     a robotic arm having a manipulator, the robotic arm being coupled to one or more movable components of the positioning assembly that are movable with respect to the motorized frame;
   detecting features of a workpiece using sensors coupled to the motorized frame;

processing data from the sensors using a control system for the mobile robot; and controlling the mobile robot based on the data from the sensors to (i) move the motorized frame to a predetermined position with respect to the workpiece in which the workpiece is located in the three-dimensional working volume, the movement being determined based on sensed features of the workpiece indicated by the data from the sensors, (ii) adjust one or more movable components of the positioning assembly, and (iii) move the robotic arm relative to the motorized frame, wherein the one or more movable components and the robotic arm are operable to position the manipulator at any position in the three-dimensional working volume with 6 degrees of freedom.

10. The method of claim 9, further comprising varying the position of one or more movable components of the positioning assembly relative to the one or more fixed components of the positioning assembly using one or more pulleys of the positioning assembly.

11. The method of claim 9, further comprising moving one or more components along one or more rails that are configured to remain in a fixed position relative to the motorized frame.

12. The method of claim 9, wherein the one or more sensors comprise:
first sensors arranged to capture information indicating three-dimensional positions of objects external to the motorized frame; and
second sensors arranged to capture information indicating three-dimensional positions of objects within the motorized frame.

13. The method of claim 9, wherein the positioning assembly is configured to translate the robotic arm within the three-dimensional working volume along three mutually orthogonal directions within the motorized frame.

14. The method of claim 9, wherein the positioning assembly comprises a first component, a second component, and a third component;
wherein the method comprises:
moving the first component such that the second component, the third component, and the robotic arm are moved along a first substantially horizontal axis;
moving the second component such that the third component and the robotic arm are moved along a substantially vertical axis; and
moving the third component such that the robotic arm is moved along a second substantially horizontal axis that is orthogonal to the first substantially horizontal axis and the substantially vertical axis;
wherein the robotic arm is able to move in six degrees of freedom without movement of the positioning assembly.

15. The mobile robot of claim 1, wherein the four legs extend vertically and are connected by beams that form a rectangular framework at the upper portion of the legs.

16. The mobile robot of claim 1, wherein the control system is configured to detect landmarks on the workpiece using output of the sensors and to control the motorized frame to autonomously move to the predetermined position with respect to the workpiece based on the detected landmarks.

17. The method of claim 9, further comprising:
detecting reduced stability of the motorized frame while the robotic arm is engaged with the workpiece; and
in response to detecting the reduced stability, controlling the mobile robot by to move the motorized frame, the positioning system, or the robotic arm to improve stability of the mobile robot.

18. The method of claim 17, wherein detecting the reduced stability of the motorized frame comprises detecting a movement of the motorized frame resulting from engagement of the robotic arm with the workpiece; and
wherein controlling the mobile robot in response to detecting the reduced stability comprises controlling the mobile robot to counteract the detected movement.

19. The method of claim 9, wherein controlling the mobile robot to adjust the one or more movable components of the positioning assembly comprises:
determining, based on a range of motion of the robotic arm or a reach of the robotic arm and sensor data describing the position of the workpiece, a position of the positioning system at which the manipulator of the robotic arm can engage the workpiece; and
instructing one or more actuators of the positioning system to translate the robotic arm into a position at which the workpiece is within the range of motion or reach of the robotic arm.

20. One or more non-transitory computer-readable media storing instructions that are operable, when executed by one or more computers, to cause the one or more computers to perform operations comprising:
navigating a mobile robot to a location, the mobile robot comprising:
a motorized frame comprising four legs that each have an upper portion and a lower portion, wherein the legs are coupled together by beams at the upper portions and wherein a three-dimensional working volume is located between the legs;
a positioning assembly coupled to the motorized frame; and
a robotic arm having a manipulator, the robotic arm being coupled to one or more movable components of the positioning assembly that are movable with respect to the motorized frame;
detecting features of a workpiece using sensors coupled to the motorized frame;
processing data from the sensors using a control system for the mobile robot; and
controlling the mobile robot based on the data from the sensors to (i) move the motorized frame to a predetermined position with respect to the workpiece in which the workpiece is located in the three-dimensional working volume, the movement being determined based on sensed features of the workpiece indicated by the data from the sensors, (ii) adjust one or more movable components of the positioning assembly, and (iii) move the robotic arm relative to the motorized frame, wherein the one or more movable components and the robotic arm are operable to position the manipulator at any position in the three-dimensional working volume with 6 degrees of freedom.

* * * * *